//  
United States Patent [19]

Miller et al.

[11] 4,041,372
[45] Aug. 9, 1977

[54] APPARATUS FOR MULTI-CHANNEL INDUCED POLARIZATION SURVEYING

[75] Inventors: Dale E. Miller; William L. Chapman, both of Ponca City, Okla.; Donald E. Dunster, Denver, Colo.; Bobby J. Thomas, Ponca City, Okla.

[73] Assignee: Continental Oil Company, Ponca City, Okla.

[21] Appl. No.: 689,952

[22] Filed: May 25, 1976

Related U.S. Application Data

[63] Continuation of Ser. No. 611,503, Sept. 8, 1975, abandoned, which is a continuation of Ser. No. 324,618, Jan. 18, 1973, abandoned.

[51] Int. Cl.² .............................................. G01V 3/06
[52] U.S. Cl. ................................................. 324/9
[58] Field of Search ........................... 324/1, 3, 6, 9, 10

[56] References Cited

U.S. PATENT DOCUMENTS

| | | | |
|---|---|---|---|
| 2,531,088 | 11/1950 | Thompson | 324/1 |
| 2,920,266 | 1/1960 | Owen | 324/1 |
| 3,329,929 | 7/1967 | Burnett | 324/9 X |
| 3,344,342 | 9/1967 | Kinghorn | 324/9 |
| 3,382,428 | 5/1968 | Sherwood et al. | 324/9 |
| 3,525,037 | 8/1970 | Madden et al. | 324/6 X |
| 3,621,380 | 11/1971 | Barlow | 324/6 X |
| 3,679,978 | 7/1972 | Hopkins | 324/9 X |
| 3,737,768 | 6/1973 | Lazenby et al. | 324/3 |

FOREIGN PATENT DOCUMENTS

| 1,370,777 | 7/1964 | France | 324/1 |

*Primary Examiner*—Gerard R. Strecker
*Attorney, Agent, or Firm*—William J. Miller

[57] ABSTRACT

A method of induced polarization geophysical surveying which derives meaningful parameters relative to the subsurface strata in both time domain and frequency domain for comparison and/or deductive data compilation and graphic depiction. The system includes a current source as energized by an input wave generator providing an input signal of predetermined frequency content, amplitude relationship and duration; in addition, a plurality of energy receiving detectors are utilized in equi-spaced array such that differential electrical measurement between successive detectors may be gained during each single input energy operation. Such differential electrical measurements are further susceptible of cross correlation relative to the input current signal to provide increased signal-to noise differentiation with respect to usable induced polarization resultant values.

9 Claims, 8 Drawing Figures

APPARATUS FOR MULTI-CHANNEL INDUCED POLARIZATION SURVEYING

CROSS REFERENCE TO RELATED APPLICATIONS

The present application is a continuation of U.S. Pat. application Ser. No. 611,503 as filed on Sept. 8, 1975, now abandoned, which application is a continuation of patent application Ser. No. 324,618 as filed on Jan. 18, 1973, now abandoned, and entitled "Method and Apparatus for Multi-Channel Induced Polarization Surveying".

BACKGROUND OF THE INVENTION

1. Field of the Invention

The invention relates generally to induced polarization surveying and, more particularly, but not by way of limitation, it relates to a system for deriving both time domain and frequency domain indications from spatially related induced polarization data.

2. Description of the Prior Art

The prior art includes many variations of the two basic types of induced polarization system, i.e. a time domain system or a frequency domain system. In either type of system current is applied to the earth through a pair of current electrodes, and resulting voltage differences are measured at a spaced distance across a pair of potential electrodes which are also disposed in conductive contact with the earth's surface. Data or indications determinative of different depths of penetration may be adjusted by the off-set or spacing between the current electrodes and the potential electrodes. Previously, the time domain types of system have applied a periodically interrupted d-c current to the earth with subsequent measurement of the earth voltage decay versus time after removal of current application. An integration of the decay curve provides a relative measure of the polarizability of the earth; however, such data is seriously affected by presence of noise.

Prior art frequency domain techniques have been utilized where a fixed period square wave current is applied to the earth through current electrodes, and the resulting voltage difference is measured at spaced receivers or potential electrodes. Thus, data is then repeated for a square wave current of same amplitude but different period to generate data for evaluation in the frequency domain. A difference between voltages measured for the two successive input frequencies is a relative measure of the polarizability of the earth at that location, but once again the presence of noise contributes to great deterioration of result.

SUMMARY OF THE INVENTION

The present invention contemplates an induced polarization surveying system wherein an input current to the earth of controlled frequency, amplitude and duration is sensed as to induced potential at a plurality of successive potential stations each of which provides electrical input to differential amplifier circuitry and subsequent electrical signal processing equipment. In a more limited aspect, the differential amplifier circuitry derives potential measurement as between each successive pair of spaced potential electrodes, and each of such differential measurements are then cross correlated with a replica of the input current having the preselected frequency, amplitude and duration characteristics. Output data is provided in any of several parameters as indicated by digital readout, multi-channel tape record, and/or compiled or digitally constructed graphic representation.

Therefore, it is an object of the present invention to provide an improved induced polarization survey system which is capable of providing both time domain and frequency domain data of more accurate and reliable character.

It is also an object of the invention to provide an induced polarization system having multi-channel processing capability which enables survey line coverage at greater speed and, therefore, at reduced cost.

It is still another object of the present invention to provide a method of induced polarization surveying wherein greater data reliability is enabled through relative information iteration.

It is also another object of the invention to provide an induced polarization system which is capable of enhancing the signal-to-noise relationship of the derived data.

Finally, it is an object of the present invention to provide an improved method and system for induced polarization of selected earth sites which is highly responsive to disseminated sulphides and provides a high degree of indication as to metal ore deposits.

Other objects and advantages of the invention will be evident from the following detailed description when read in conjunction with the accompanying drawings which illustrate the invention.

BRIEF DESCRIPTION OF THE DRAWINGS

FIG. 6 is a block diagram of an alternative type of system as utilized in accordance with the present invention.

DETAILED DESCRIPTION OF THE INVENTION

Figure 1:
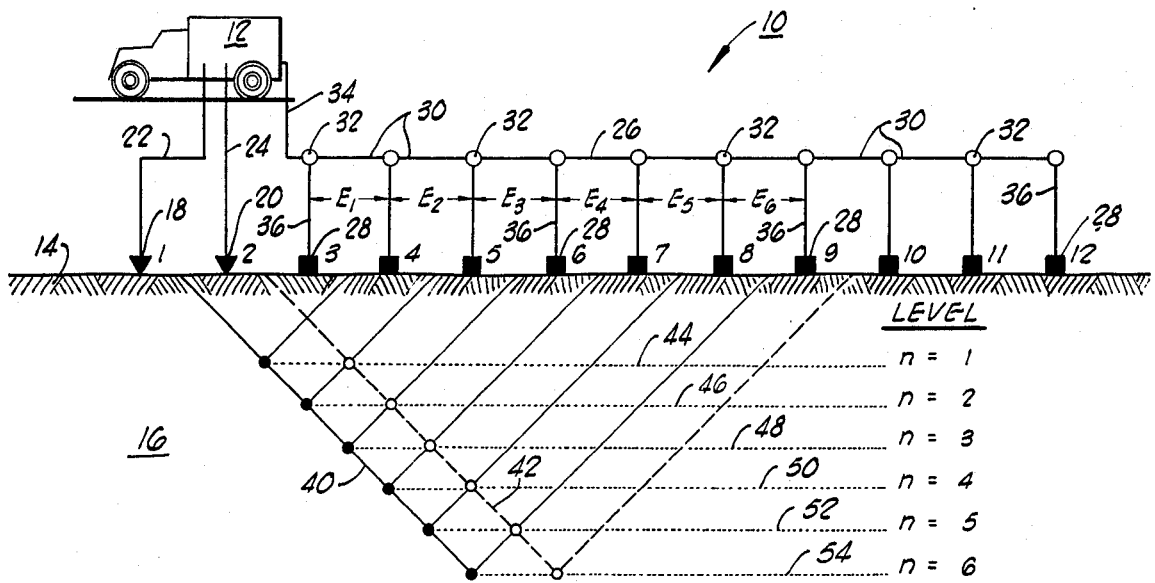
FIG. 1 is a schematic representation illustrating the method of the present invention.

Referring now to FIG. 1, a field layout 10 includes an operations truck 12 and associated equipment as arrayed along a survey line on earth surface 14 overlying subterrain 16. The operations truck 12 may be any of the various conventional field electronics carriers adapted to include the necessary induced polarization electronics as will be further described in detail. Energy input to the earth is effected between current electrodes 18 and 20 as connected via cables 22 and 24 leading from the associated equipment in operations truck 12. A receiving cable 26 is connected between operations truck 12 and a plurality of potential electrodes 28 disposed in spaced relationship therealong in contact with earth surface 14.

The receiving cable 26 as presently designed is a ten conductor cable made up of a plurality of cable lengths 30 successively interconnected by a plurality of connector unions 32. A truck connector cable 34 then provides plural conductor connection between operations truck 12 and the first connector union 32 (position 3) which will be effective in the particular shot sequence. Each of the potential electrodes 28 includes a single conductor cable 36 which is also adapted for connection into its associated connector union 32. The connector unions 32 are wired in novel manner in order to facilitate quick connect and disconnect operations and enable the operations truck 12 to rapidly move down the survey line, as will be further described in detail.

Basically, the method consists of energization between current electrodes 18 and 20 by a selected form of alternating current, i.e. an alternating current of preset frequency, amplitude and duration. The potential field is then sensed as between successive ones of potential electrodes 28 extending along receiving cable 26. Thus, a first voltage difference $E_1$ is derived from voltages sensed at positions 3 and 4, a voltage difference $E_2$ is sensed as between positions 4 and 5, a voltage difference $E_3$ is sensed as between positions 5 and 6 and so forth out to the end potential electrode 28 which is being utilized. Present equipment has provision for six channels and, therefore, only the voltage differences $E_1$ through $E_6$ across positions 3 through 9 are depicted in FIG. 1. However, it should be understood that there is no limitation other than practicality on the length of receiving cable 26, as well as the number of voltage differences utilized, and the number of channels simultaneously processed, through the equipment within operations truck 12.

The graphic subject matter depicted in FIG. 1 beneath earth surface 14 represents a conventional way (idealized) of presenting induced polarization data. The derived data whether it be resistivity rho, percent frequency effect (PFE), or metal factor value, which is obtained for a given current dipole and a given potential dipole, is plotted at the intersection of 45° lines passing through the midpoints of the two dipoles. Thus, the six values of derived data (whether they be resistivities, PFE's, or metal factors) which are obtained for a given current dipole and the first six potential dipoles are plotted on a 45° line 40 which extends through the current dipole positions 1 and 2. Upon attainment of sufficient data at this position, operations truck 12 would then move (in reverse) to a next position whereupon positions 2 and 3 would become the current dipole placement while differential voltages $E_1$ through $E_6$ would be sensed by consecutive dipole arrays positioned between positions 4 through 10. The data derived from this next station positioning are plotted along dash line 42, a 45° line parallel and one station removed from line 40 along the survey line.

Due to the general adherences as to spatial distribution of a potential field, each dipole separation may be represented as an integral number $n$ of station spacings. Thus, all of the $n=1$ readings are plotted along a first horizontal line 44, all $n=2$ readings are plotted along a second horizontal line 46 and so forth as respective readings for $n=3, 4, 5,$ and 6 are plotted along respective horizontal lines 48, 50, 52 and 54. The greater the separation between current and potential dipoles, the deeper will be the earth material which is sampled.

It is important to realize that the relation between the plot or $n$ value levels and the actual physical depth is not a linear one. Furthermore, this relationship varies with the geology. That is, whereas the $n=6$ reading definitely averages deeper material than the $n=3$ reading, it is not necessarily twice as deep as the plot of FIG. 1 might suggest. Another important factor is that as the current/potential dipole separation is increased, the volume of material sampled by the measurement increases laterally as well as vertically. Thus, a pseudo-depth plot shows only the gross relative positions of analomous material, and further interpretation and empirical modeling alteration is generally required to validate the earth depth relationships.

Figure 2:
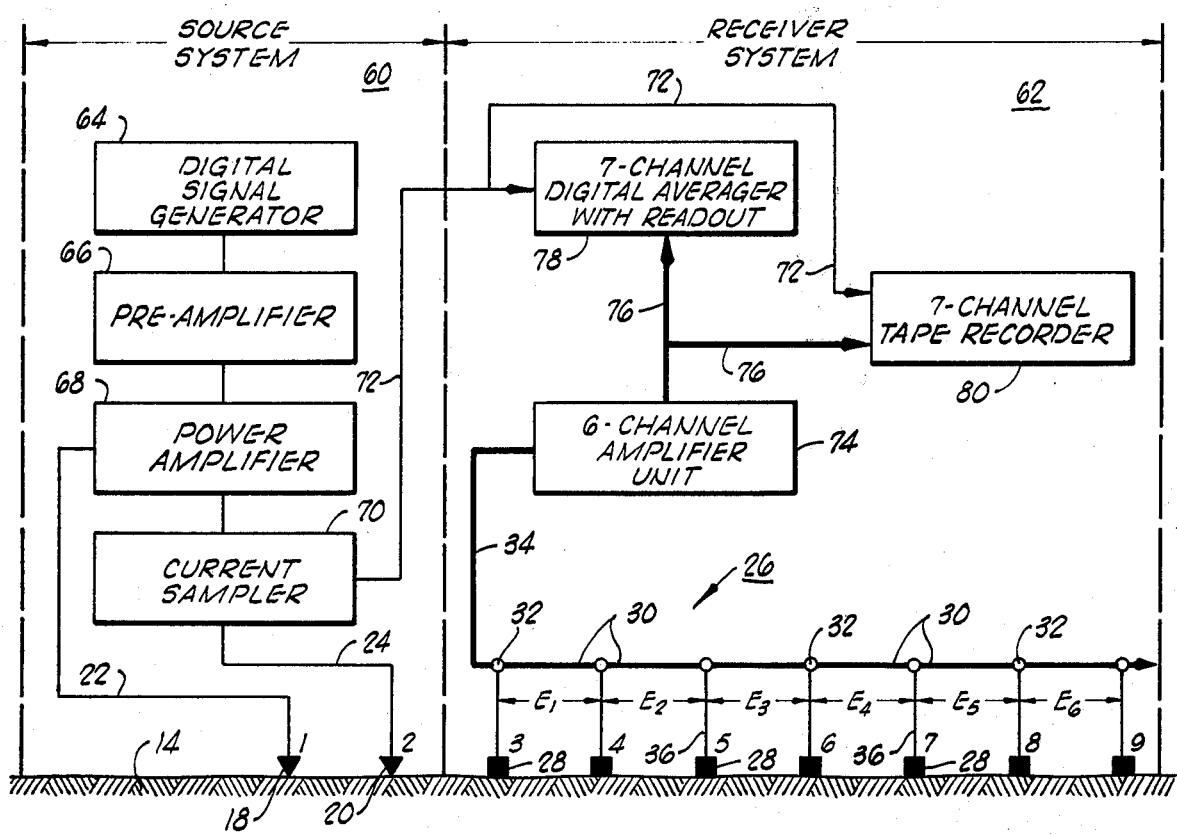
FIG. 2 is a block diagram illustrating a system for induced polarization as constructed in accordance with the present invention.

FIG. 2 illustrates a system for carrying out an induced polarization survey in accordance with the invention. The system generates a selected alternating current energizing signal for dipole induction into the earth through contact with earth surface 14, and what is designed as a receiver system 62 includes the serially arrayed potential electrodes 28, receiver cable 26 and plural channel amplification, analyzing and output circuitry. The source system 60 includes a digital signal generator 64 which is adjustable to generate any of various forms of current control signal. The digital signal generator 64 is controllable to provide variations as to any of frequency, amplitude or output duration of the basic replica or control signal which is then applied for amplification in a pre-amplifier 66. The output of the preamplifier 66 is applied to the input of the power amplifier 68 (current generator). A commonplace low frequency oscillator would be adequate for generation of sinusoidal sweeps; however, use of a digital signal generator 64 enables output of any of sinusoidal shapes, sweeps, square waves, step wave functions, etc., and the digital sweep generator has the advantage of exact repeatability of signal wave form and length. A suitable orm of digital signal generator 64 for sinusoids and swept sinusoids is commercially available from the Digital Applications Company of Torrance, California.

The pre-amplifier 66 and the power amplifier 68 may be selected from various commercial types depending upon the exigencies of the particular job requirements, the specifications of the amplifiers depending upon the desired input signal. For general induction polarization surveys to a depth of a few hundred feet, the amplifiers should be capable of functioning in the range of about 0.005 Hertz to about 5 Hertz with a final power output on the order of 1 kilowatt at a minimum peak-to-peak voltage of 500 volts. Higher voltage and power output at lower frequencies may be preferable, and especially so for enabling deeper surveys. A particular form of pre-amplifier presently utilized in field work is the model MA-1 DC servo amplifier which is commercially available from Inland Controls, Inc., Boston, Massachusetts.

Output energy from pre-amplifier 66 is then utilized to drive a current generator or power amplifier 68 which, in present field survey systems, is selected to be a rotary amplifier, i.e. a form of d-c generator wherein the field coils are energized by the applied drive signal from the pre-amplifier 66. A type of rotary amplifier which is suitable for this application is the generator model No. G5123-A which is commercially available from Inland Motor Corporation, Radford, Virginia. Current output from the armature of the current generator, power amplifier 68, is then applied between current electrode 18 in contact with earth surface 14 and a current sampler 70.

Current sampler 70 serves to take off a replica voltage proportional to the current output from current generator 68 for conduction via line 72 to the receiver system 62, as will be further described below. Current sampler 70 is an inductive device such that current output from current generator 68 is also applied via line 24 to the remaining electrode 20 of the current dipole in conductive contact with earth surface 14. The current sampler 70 is a bi-directional d-c current sensor, passthrough hole type, series 925 B-10 which is commercially available from American Aerospace Controls, Inc., of Farmingdale, New York.

There are various forms of current electrode which are commercially available and which would be suitable for use as current electrodes 18 and 20. However, experience has shown that the best possible energy coupling or conduction into the earth's surface is achieved by a relatively unsophisticated but practical structure. Each of current electrodes 18 and 20 are formed by digging a hole or group of holes in the earth's surface at the designated surface position, soaking the hole with salt water, lining the hole with conductive foil such as aluminum foil, refilling the removed earth material into the hole over the foil, and attaching the respective energizing cable 22 or 24 to the foil by removable clamp or alligator clip.

Referring now to receiver system 62, sensed potential at each of potential electrodes 28 is conducted via separate conductor through plural conductor receiver cable 26 and connector cable 34 for input to a six channel amplifier unit 74. Each channel of amplifier unit 74 may be of similar construction and type selected from many well-known types of conventional amplifier. The primary requisites for the amplifiers are differential input, high sensitivity, and a high common mode rejection factor in excess of 100 decibels. Amplifier unit 74 is designated as a six channel circuit; however, this is a matter of choice depending upon the system design and potential sensing stations, all of which are variable as a matter of choice. The six channel system has been found to be practical in field operations as therefore designated herein. Each channel of amplifier unit 74 receives differential input from successive pairs of potential electrodes 28 via cable connector 34. Thus, the sensed potentials $E_1$ through $E_6$ would be differentially amplified through the respective six channels of amplifier unit 74.

Output from amplifier unit 74 consisting of the six amplified potential differences (potentials $E_1$-$E_6$) are output via plural conductor cable 76 for input to each of a seven channel digital averager circuitry 78 as well as a seven channel tape recorder 80. The seven channel digital averager 78 is comprised of extensive circuitry as will be further described, and, while six channels receive differential voltage output from amplifier unit 74, a seventh channel receives the replica signal on line 72 from current sampler 70. Current sampler 70 may be such as a magnetic modulator device which provides a voltage output on line 72 which is proportional to the actual current applied into the earth. The voltage signal on line 72 is also applied to a channel of tape recorder 80. The tape recorder 80 may be a conventional plural channel frequency modulated tape recorder of the type which is quite widely employed in the geophysical prospecting technology, such units in the present system being commercially available from Pemco, Inc. of Palo Alto, California.

Figure 3:
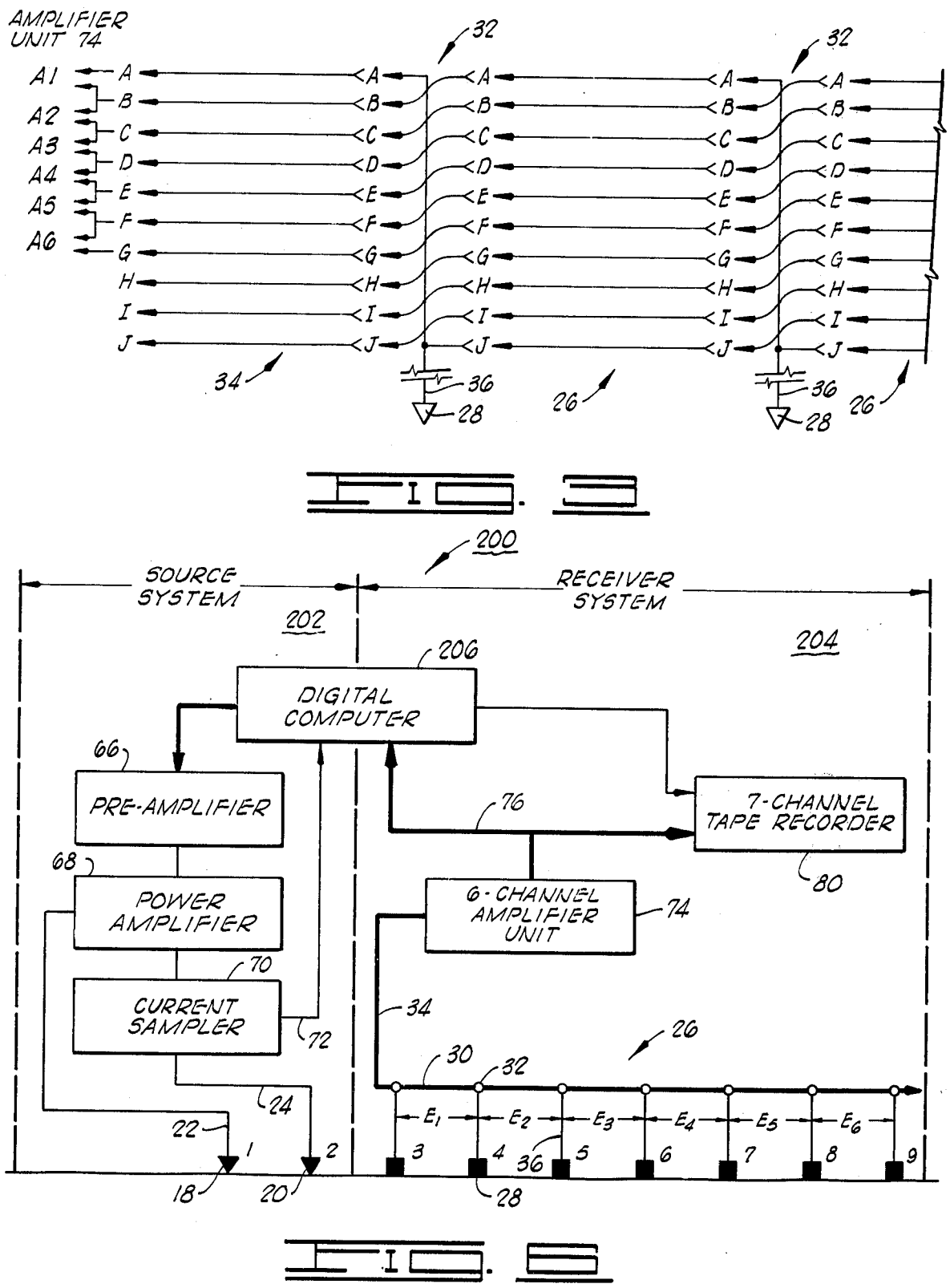
FIG. 3 is a schematic diagram of a union as utilized in the present invention.

FIG. 3 illustrates in schematic form a portion of the receiver cable 26, and particularly showing the novel inner wiring of connector unions 32 which enable rapid station move-up of the survey system of field layout 10 without the necessity for undue cable movement during such station movement. Each of connector unions 32 is identically wired and each of cable lengths 26 and connector cable 34 are identically wired. Each of connector unions 32 are comprised of bendix-type connectors having inner connection staggered as shown with A-B, B-C, C-D, etc. with connection of J being lead back to the output A. The particular station potential electrode 28 and its lead 36 are also connected to the J-A connection. This configuration being present in each connector union 32 enables the operations truck 12 (FIG. 1) to continually move from one station to the next during move-up operation for next shot sequence, and each time the re-connection of the connector cable 34 to the first connector union 32 in the linear station array will assure that the seven sensed potentials of the station array will be present on pins A through G at the truck end of connector cable 34 for input to the differential amplifiers A1-A6 of amplifier unit 74. Thus, those potential electrodes disposed a preset number of stations from the operations truck 12 will always appear at the same inputs to amplifiers A1-A6 of amplifier unit 74.

Figure 4:
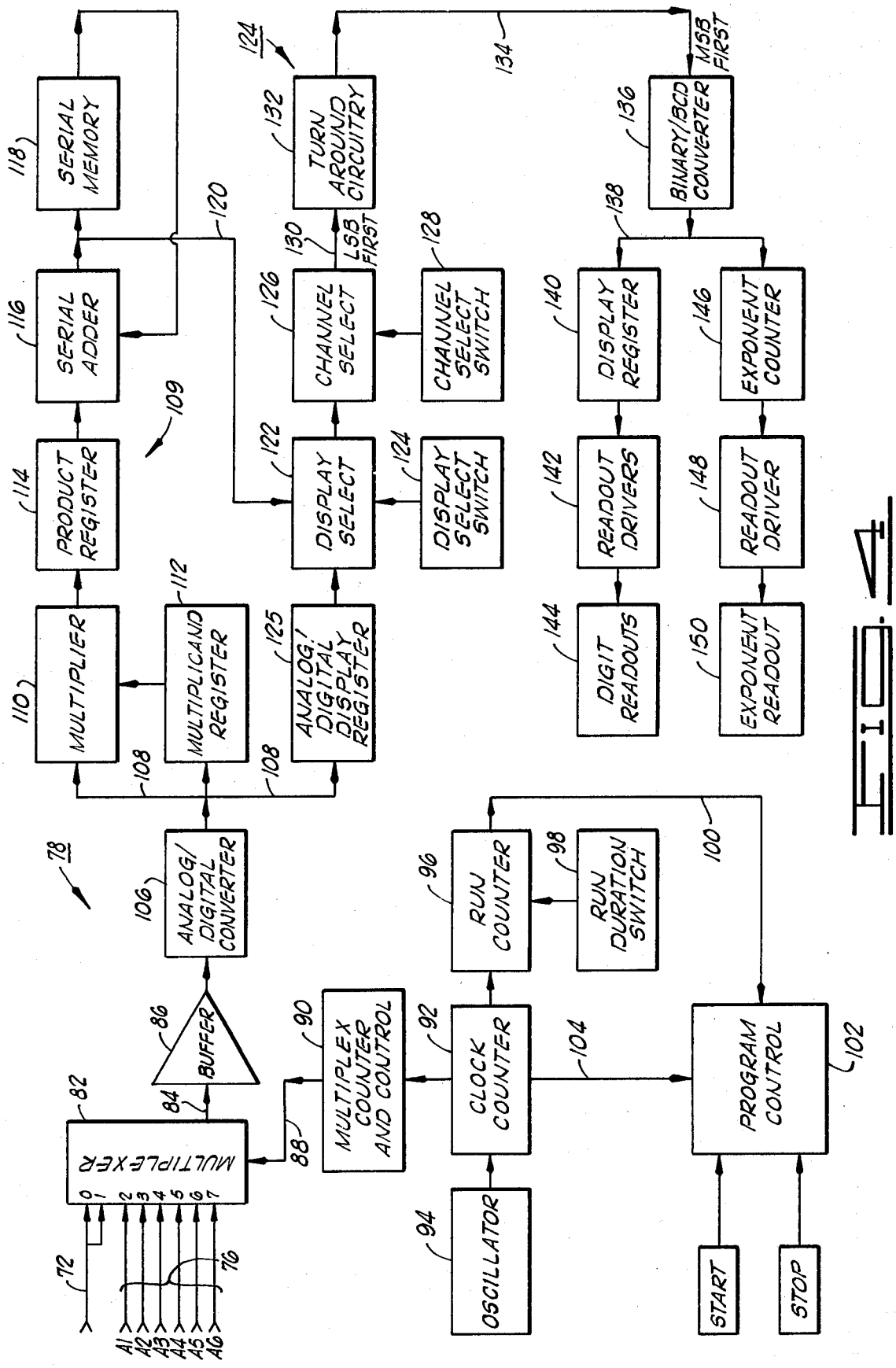
FIG. 4 is a block diagram of digital averaging circuitry constructed in accordance with the present invention.

The seven channel digital averager with readout circuitry 78 of FIG. 2 is shown in greater detail in FIG. 4. Thus, the digital averager circuitry 78 includes an input multiplexer 82 which receives input from line 72 and plural conductor cable 76. That is, the replica or input control signal from current sampler 70 is applied via lead 72 for input to one channel of multiplexer 82 while the output from differential amplifiers A1-A6 of amplifier unit 74 is applied to respective sequential inputs of multiplexer 82. Multiplexer 82 may be a conventional form of time slice multiplexer which provides time multiplexed analog signal output via line 84 to a buffer amplifier 86. The time rate of multiplexing and sequencing is controlled by input on a lead 88 from multiplex counter and control circuitry 90 which is further controlled in response to output from the system clock counter 92 and time base oscillator 94. In present field systems, the oscillator 94 is a conventional form of oscillator circuit operating at 4 megahertz, which rate is then counted down by the clock counter 92 for output to the multiplex counter and control circuitry and derivation of a selected multiplexing rate. Output from clock counter 92 is also applied through a run counter circuitry 96 which may be activated by a run duration switch 98 to provide an output via lead 100 to program control 102.

The program control 102 functions in synchronism with clock counter 92 as clock output is applied via lead 104, and program control 102 provides a master control for the overall system operation thereby to synchronize all signal sequences and operations throughout the system. Thus, the master or central program control 102 initiates operation of digital signal generator 64 (FIG. 2) to start operation of a field sequence, and all operations associated with the system are maintained in synchronous relationship. Run duration switch 98 is a thumb wheel switch within operator's access which serves to control the number of counts output from run counter 96 thereby to control the operation duration of source system 60.

Received signal indications as multiplexed and passed through buffer amplifier 86 are then applied to an analog/digital converter 106 with output of digital signals via line 108. The digital signals on line 108 are applied to a multiplier circuit 110 as well as a multiplicand register 112 which sets the multiplication factor in the multiplier 110. Multiplied digital values are then placed in a product register 114 for shift through a serial adder 116 and cycling serial memory 118.

The multiplier 110, product register 114, serial adder 116 and serial memory 118 actually perform digital correlation on all channels of multiplex data as output from analog/digital converter 106. Thus, each channel of data is multiplied and integrated over a specified time span in relation to real-time. The correlation circuitry 109 is of conventional form wherein successive multiplex data samples are first multiplied, by successive outputs from multiplicand register 112 and multiplier 110, by a pre-set factor for storage in proper data channel relationship in product register 114. Once again, successive data samples shifted out of product register 114 through serial adder 116 perform time integration as serial memory 118 continually shifts back summed data over the designated time span. Correlated output of the current or replica control signal as well as correlated output form each of the potential difference traces ($E_1$-$E_6$) is provided via conductor 120 for input to display select stage 122. The correlation circuitry 109 provides a means for field processing of frequency domain data as one channel of output gives a digital value proportional to the zero-shift auto correlation of the current or replica control trace while the remaining channels give digital values proportional to the zero-shift cross correlations of the replica control race relative to each one of the potential difference traces.

The correlated output digital data is then displayed by the correlation readout circuitry 124. Thus, originally converted multi-trace data on lead 108 is applied to analog/digital display register 126 whereupon it is available for shift into display select circuit 122 which also receives correlated data via conductor 120. A toggle switch, display select switch 124, is available for control of display select 122 to control output of either the analog/digital data or the correlated digital data to a channel select circuit 126. Channel select 126 constitutes logic circuitry which, when controlled by a thumb wheel type channel select switch 128, selects the desired channel of information for output via conductor 130. That is, channel select switch 128 selects digital representation of either the replica control trace or a selected one of the potential traces for output on conductor 130.

The output on conductor 130 is shifted out with the least significant bit first and, in order to provide proper conversion for readout, it is necessary to include turn around circuitry 132. The turn around circuitry 132 constitutes conventional register circuitry, which may be of flip-flop type, which allows digital data input in a first direction to be clocked out and reversed such that the selected channel data output on a conductor 134 is ordered with the most significant bit first for input to a binary/BCD converter 136. Thus, the converter 136 converts the binary data train to BCD digital data on conductor 138 in accordance with usual readout practice.

The BCD data on conductor 138 is then applied through a display register 140 to be shifted out for energization of the respective readout drivers 142 controlling digit readouts 144. In present practice, commercially available light emitting diode devices are utilized in the digit readout stage 144. The BCD data on output conductor 138 is also applied through an exponent counter circuit 146 which, in accordance with count, provides periodic energization of readout driver 148 for control of yet another light emitting diode device, exponent readout 150.

OPERATION

Prior data evaluations and determinations having been made relative to a selected survey site, the induced polarization field layout 10 (FIG. 1) is positioned at some arbitrary starting point along a chosen survey line. The field layout 10 is essentially a multichannel induced polarization testing system which enables simultaneous measurement of a plurality of spaced potential electrodes over a preselected time. Duration is selected in accordance with the exigencies of the particular survey, characteristics of the terrain, electrical noise, etc. in order to bring about optimum digital data averaging thereby to improve the signal-to-noise ratio, a factor proportionate to length of time over which data processing and signal measurement is continually averaged.

Upon stationing of field layout 10 and operations truck 12, current is applied to the earth's surface at positions 1 and 2 via current electrodes 18 and 20. Energization for current application is derived from digital signal generator 64 (FIG. 2) through pre-amplifier 66 and the rotary power amplifier or current generator 68. Generally speaking, for conventional survey work, the digital signal generator 64 will be set to provide a steady-state sinusoidal wave at a preselected frequency between 0.005 and 8 Hertz. It is contemplated that there will be applications wherein the applied current wave form will take the form of a pre-set frequency varying linearly with time as there is increasing indication that swept frequency signal input will be useful for studies relating to frequency response of different materials. The amount of time or duration of input current voltage varies with requirements of the job and is directly related to the necessary avaraging time required by the receiver system 62 in building up good signal-to-noise data signals.

Thus, a usual approach might be to derive a first data group reading with the current input between current electrodes 18 and 20 at 0.1 Hertz for a time on the order of ten minutes duration, during which time differential electrode voltage values $E_1E_6$ are continually being sensed, multiplexed in multiplexer 82 (FIG. 4), and correlated through the correlation circuitry 109 (FIG. 4), with subsequent display at readout circuitry 124 (FIG. 4) and/or plural channel analog data recording at tape recorder 80 (FIG. 2).

Subsequent runs of similar duration might then take place at 1.0 Hertz current input frequency, and still other selected differing current wave frequencies within the extremely low range of frequencies which are of value.

The processing performed by the digital averager circuitry 78 is equivalent to passing the signal through a filter with a very narrow pass band which is centered at the frequency of the polarizing current, i.e. as applied via current electrodes 18 and 20. The sharpness of the filter will increase with increased recording time. Thus, for each run at a given frequency, the digital averager will read out a plurality of numbers (in the illustrated case seven) which are proportional to, respectively an autocorrelation of the current trace as well as each potential difference trace correlated with the current trace. The number values read out at digit readouts 144 and exponent readout 150 through successive manipulations of channel select switch 128 are then tabulated for use in computing the resistivities, percent frequency effect, and metal factors.

For example, the frequency domain induced polarization response or Percent Frequency Effect (PFE) is given by the following formula:

$$PFE_{mn} = \frac{\frac{I * V_{mn}}{I * I} f_l - \frac{I * V_{mn}}{I * I} f_h}{\frac{I * V_{mn}}{I * I} f_l} \times 100$$

where * means cross correlations, $f_l$ and $f_h$ are two input frequencies (low and high), $V_{mn}$ is the potential difference between selected electrodes $m$ and $n$, and $I$ is the input current. In addition to the PFE values, well-known calculation format and/or programmed machine computation will readily yield other related factors as to resistivity, metal factor and yet more specialized data indications such that any of the various parameters can be plotted graphically in various two dimensional or three dimensional representations.

Figure 5A:
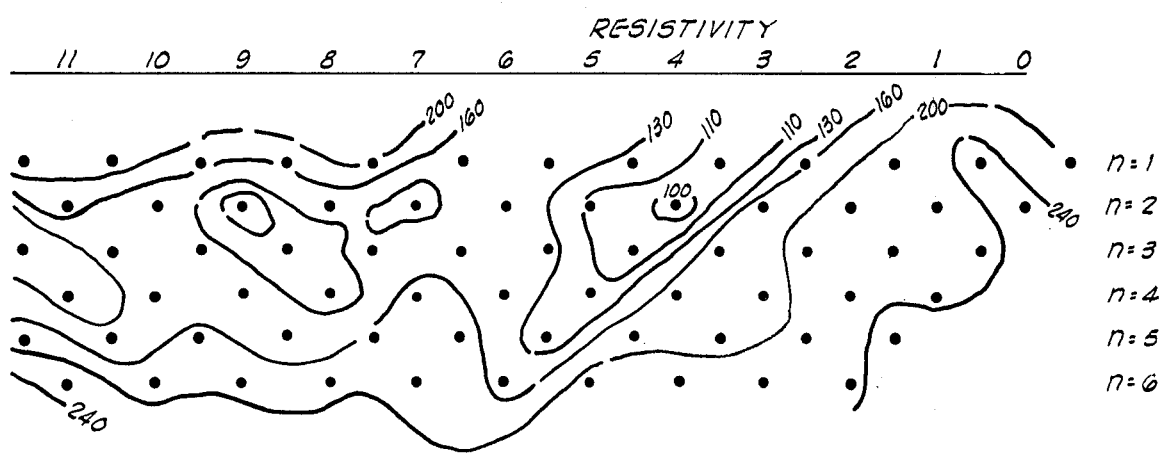
FIGS. 5A, 5B and 5C are three types of data displays resulting from measurements made with the present invention.
Figure 5B:
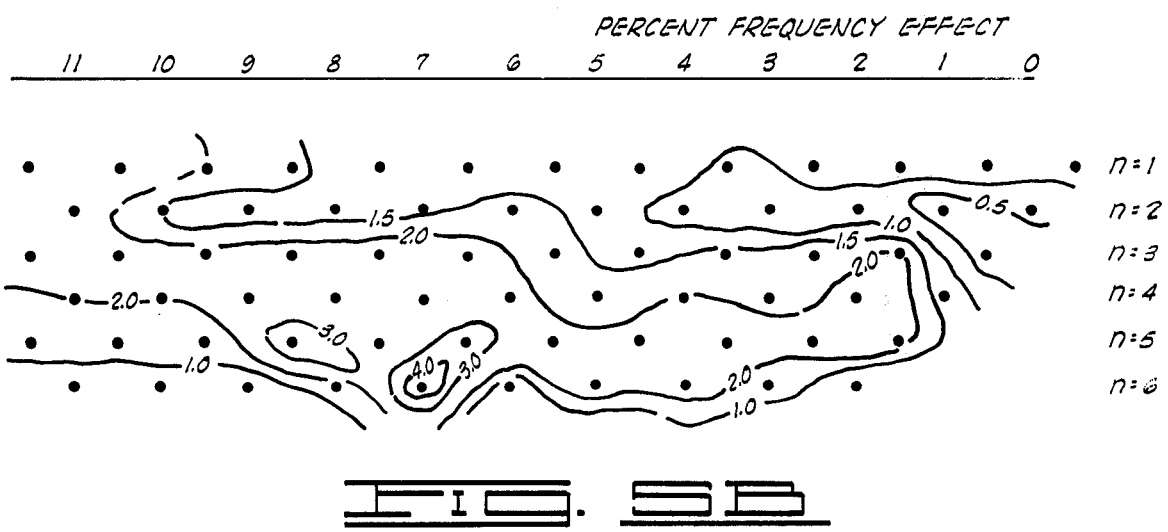
Figure 5C:
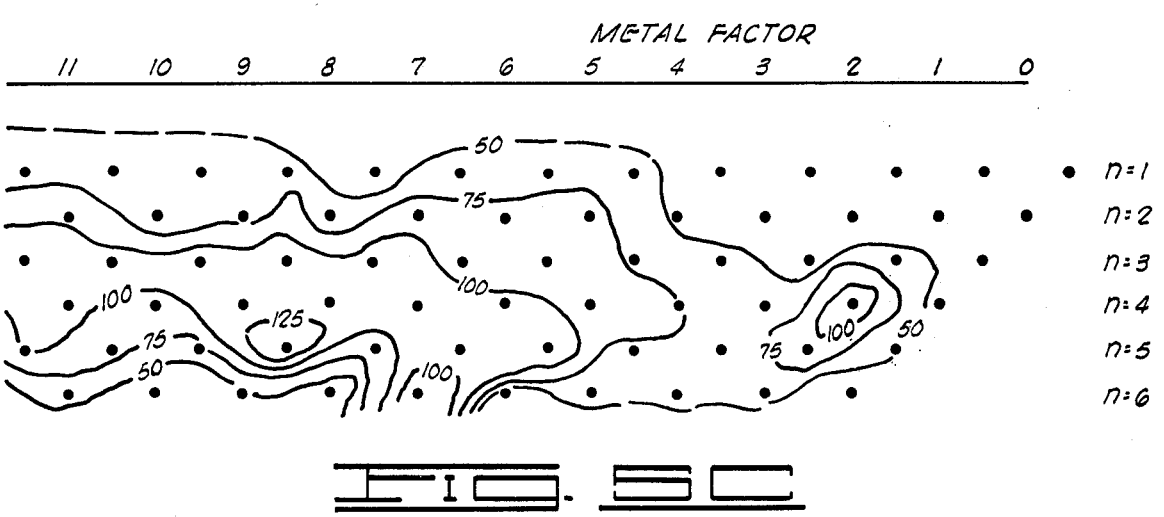

FIGS. 5A, 5B and 5C illustrate portions of a survey showing the comparable data for resistivity, percent frequency effect and metal factor. FIG. 5A represents a resistivity graph for a six potential level or $n=6$ situation which would be derived from the field layout 10 as depicted in FIG. 1. Thus, the numerals from 0 to 11 along the abscissa coordinate are representative of spaced stations along the earth's surface while data is represented at the various $n=1$ through $n=6$ levels. The resistivity values are then contoured in values as indicated.

The percent frequency effect data values are plotted in similar manner as shown in FIG. 5B. The surface position coordinates are maintained in similarly aligned disposition while the PFE data values are entered at the relative $n$ locations for each successive potential electrode pair (see FIG. 1). Once again, selected values provide a contour delineation as to value groupings and trends. FIG. 5C illustrates the same graphic array for representation of the metal factor data values. Actually, while each of FIGS. 5A, 5B and 5C show the plurality of $n$ positions (relative) as dots, actual practice finds the precise data values printed at each dot position whether resistivity, percent frequency effect, metal factor, or other relative value.

FIGS. 6 illustrates an alternative form of the invention which may well manifest the general trend in induced polarization systems of the general type disclosed herein. This is due to the fact that ruggedized and miniaturized digital computers are becoming available in various forms for total capability of processing within field mobile structures or vehicles. In the FIG. 6 field layout 200 the operational components of the source system 202 and receiver system 204 are the same as those disclosed with respect to FIG. 2. The primary difference is that a digital computer 206 of specified type may be utilized to control generation of the input current signal as well as to perform all cross correlation and digital computation operations to provide display, printout or other selected output of the finished induced polarization data. The digital computer 206 can be utilized to provide rapid calculation of all time domain and frequency domain data.

There are now commercially available several forms of computational equipment which would be suitable for use as digital computer 206. Such computational equipment may be a general purpose, small capacity and limited storage machine, or the system may utilize one of the various special purpose computers which have been particularly constructed for use in the geophysical prospecting technology. In any event, use of the digital computer 206 will greatly facilitate induced polarization surveying in accordance with the present method due to the fact that the system can be completely automatic and synchronous in every aspect, i.e. from the initial construction of a selected input current wave form, through the intermediate phases of cross correlation and signal-to-noise enhancement, to the final calculation operations providing information output in any of various formats or relationships.

The foregoing discloses a novel induced polarization method and system which will enable much increased speed and reliability in ascertaining probability of and in locating the presence of mineral and ore deposits in the earth substrata. Use of the method has exhibited an increased capability of developing relative subsurface data of more reliable nature through increased differentiation capability in the presence of surrounding noise and natural interferences. Processing of serially and spatially related data simultaneously over a time averaging interval enables improved continuity of data with the further compound result that much fewer crew man hours are consumed for a given survey accomplishment.

Changes may be made in the combination and arrangement of steps and elements as heretofore set forth in the specification and shown in the drawings; it being understood that changes may be made in the embodiments disclosed without departing from the spirit and scope of the invention as defined in the following claims.

What is claimed is:

1. A system for multiple channel induced polarization geophysical surveying along a selected earth surface line of survey, comprising:
   a pair of current electrode means disposed in conductive contact with said earth surface in predetermined spacing at a selected current induction point;
   signal generator means connected to energize said current electrode means which is adjustable to apply thereto a selected amplitude varying signal for energization of said current electrode means;
   a plurality of potential electrodes each disposed in contact with said earth surface in predetermined successive array, said potential electrodes being spaced and extending at selected spacing from said current induction point;
   differential amplifier means having plural input channels;
   a plurality of plural conductor cable means serially interconnected with a selected different conductor of each successive plural conductor cable means connecting a successive one of the respective successively arrayed potential electrodes, and including an additional plural conductor cable means connecting the first successively arrayed potential electrode such that said plural conductors are applied as input to respective different input channels of said differential amplifier means thereby to provide plural output signals each of which is indicative of potential difference as between a selected pair of the successively arrayed potential electrodes;
   current sampling means for providing a replica signal indicative of said signal generating means amplitude varying signal;

signal averaging means receiving said potential difference output signals from each respective channel of said differential amplifier means as well as receiving said replica signal output from said current sampling means, whereby each of said potential difference output signals is averaged with said replica signal over a predetermined duration to provide output of respective potential difference data values; and means receiving each of said respective potential difference data values for generating an output display to indicate simultaneous relative potential variations representative of multiple depths along said line of survey on said earth surface.

2. A system as set forth in claim 1 which is further characterized in that:

said signal generator means is adjusted to energize said current electrodes with a sinusoidally alternating current input signal over a selected duration.

3. A system as set forth in claim 2 which is further characterized in that:

said sinusoidally alternating current frequency of energization is controlled to lie within the frequency range of 0.005 Hz to 8 Hz.

4. A system as set forth in claim 1 wherein said signal averaging means comprises:

multi-channel correlating means wherein a first channel provides output of zero shift autocorrelation of the replica signal, and the remaining channels give output data values proportional to the zero-shift cross correlations of the respective potential difference output signals from each channel of said differential amplifier means with said replica signal.

5. A system as set forth in claim 1 wherein said signal generator means comprises:

digital signal generator means generating said amplitude varying current energization signal for input to said current electrode means.

6. A system as set forth in claim 4 wherein said signal generator means comprises:

digital signal generator means generating said amplitude varying current energization signal for input to said current electrode means.

7. A system as set forth in claim 6 wherein said digital signal generator means comprises:

a digital computer which is utilized to perform the steps of digitally generating said energizing input signal to the current electrode means, as well as to digitally average each of said plurality of potential electrode output differential values for subsequent correlation with said current electrode replica signal.

8. A system as set forth in claim 1 wherein each of said plurality of plural conductor cable means interconnecting successive potential electrodes, comprises:

plural parallel conductive means extending along the length thereof; and union means for joining said successive ones of said cable means, said union means receiving parallel input of said cable means conductors and providing uniformly unit-displaced output connection for all but a selected one of said inputs whereupon the remaining output is connected to the respective potential electrode disposed at that union means junction.

9. A system as set forth in claim 8 which is further characterized in that:

a plurality of identical union means are utilized at the cable junction of each potential electrode thereby to provide successive displacement of input signals to said differential amplifier means while necessitating only the addition of succeeding plural conductor cable means and potential electrode means while proceeding along the line of survey.

* * * * *